United States Patent
Baek (10) Patent No.: US 8,681,236 B2
(45) Date of Patent: Mar. 25, 2014

(54) APPARATUS AND METHOD FOR REDUCING SHUTTER LAG OF A DIGITAL CAMERA

(75) Inventor: Jae-Myung Baek, Hwaseong-si (KR)

(73) Assignee: Samsung Electronics Co., Ltd. (KR)

(*) Notice: Subject to any disclaimer, the term of this patent is extended or adjusted under 35 U.S.C. 154(b) by 282 days.

(21) Appl. No.: 12/797,238

(22) Filed: Jun. 9, 2010

(65) Prior Publication Data

US 2010/0321530 A1    Dec. 23, 2010

(30) Foreign Application Priority Data

Jun. 18, 2009    (KR) ................... 10-2009-0054527
Apr. 22, 2010    (KR) ................... 10-2010-0037289

(51) Int. Cl.
     *H04N 5/228*      (2006.01)

(52) U.S. Cl.
     USPC ............................................ 348/222.1

(58) Field of Classification Search
None
See application file for complete search history.

(56) References Cited

U.S. PATENT DOCUMENTS

| | | | |
|---|---|---|---|
| 2002/0186311 A1* | 12/2002 | Sevat et al. | 348/283 |
| 2003/0090585 A1* | 5/2003 | Anderson | 348/333.11 |
| 2003/0189647 A1* | 10/2003 | Kang | 348/207.99 |
| 2004/0070679 A1* | 4/2004 | Pope | 348/231.99 |
| 2005/0078197 A1 | 4/2005 | Gonzalez | |
| 2006/0204122 A1* | 9/2006 | Onozawa | 382/255 |
| 2008/0074513 A1 | 3/2008 | Noguchi | |
| 2008/0284866 A1 | 11/2008 | Mizutani | |
| 2009/0041355 A1* | 2/2009 | Sakaji et al. | 382/190 |

FOREIGN PATENT DOCUMENTS

| | | | |
|---|---|---|---|
| JP | 2005-94288 | * | 4/2005 |
| JP | 2005-311947 | | 11/2005 |

* cited by examiner

*Primary Examiner* — Albert Cutler
(74) *Attorney, Agent, or Firm* — The Farrell Law Firm, P.C.

(57) ABSTRACT

An apparatus and method for reducing a shutter lag in a device with a digital camera function, in which an electronic shutter can be driven in a state of a half shutter or a full shutter, and a controller controls execution of a sub-sampling preview mode if the camera function is driven, controls to fix white balance and exposure and automatically adjust a focus upon detecting an input of the half shutter during the execution of the sub-sampling preview mode, switches to a full-pixel preview mode after completion of the adjustment, and performs image capturing upon detecting an input of the full shutter.

15 Claims, 8 Drawing Sheets

APPARATUS AND METHOD FOR REDUCING SHUTTER LAG OF A DIGITAL CAMERA

PRIORITY

This application claims priority under 35 U.S.C. §119(a) to a Korean Patent Application filed in the Korean Intellectual Property Office on Jun. 18, 2009 and assigned Serial No. 10-2009-0054527, and a Korean Patent Application filed in the Korean Intellectual Property Office on Apr. 22, 2010 and assigned Serial No. 10-2010-0037289, the entire disclosure of each which are hereby incorporated by reference.

BACKGROUND OF THE INVENTION

1. Field of the Invention

The present invention relates generally to an apparatus and method for controlling a camera function in a device with a digital camera function, and more particularly, to an apparatus and method for reducing a shutter lag of a digital camera.

2. Description of the Related Art

A device with a digital camera function, like a mobile wireless terminal equipped with a camera module, starts a preview mode in which a user can view preview images in real time, when the user chooses the camera function. If the user decides on a photographing target while viewing preview images in the preview mode, the user first presses a half shutter to perform Auto Focus (AF), and then presses a full shutter at a desired time to take a picture. At this moment, mode switching (or mode transition) takes place from the preview mode to a capture mode, in which the picture is stored.

A series of operations, including the mode switching, requires time. So, actually, the user gets a picture taken at a time delayed by some extent from the time the shutter is pressed, rather than obtaining a picture taken at the exact moment the shutter is pressed. Such delay is referred to as a 'shutter lag'. In other words, the shutter lag refers to a time from the moment the user pressed the shutter until the time a picture capture function starts. Because of the shutter lag, the user cannot get the picture taken at the exact time he actually desired.

Generally, in a cell phone's camera, an AF time of about 0.5 to 1 second is required and a shutter lag of 0.1 to 0.3 seconds occurs. Since the user knows the fact that though the shutter lag is shorter than an AF lag, which is the time required for focusing, the picture is taken after a delay rather than being taken at the moment the shutter is pressed, user satisfaction with the captured image may fall.

Many attempts to exclude the switching process from the preview mode to the capture mode using full-pixel preview have been made to reduce the shutter lag.

For example, to accomplish a zero shutter lag, Scalado AB has introduced a technology for burying a hardware Joint Photographic Coding Experts Group (JPEG) compression function and a large-capacity buffer memory in a device with a camera module, compressing multiple full-pixel frames, and storing the frame captured at the time closest to the moment the shutter was pressed by a user. However, use of this technology additionally increases the cost and causes power consumption due to encoding and decoding for the compression.

SUMMARY OF THE INVENTION

An aspect of the present invention is to address at least the above-mentioned problems and/or disadvantages and to provide at least the advantages described below. Accordingly, an aspect of the present invention provides an apparatus and method for reducing a shutter lag of a digital camera, and exactly acquiring the image presently being displayed on a display.

In accordance with one aspect of the present invention, there is provided an apparatus for reducing a shutter lag in a device with a digital camera function, in which an electronic shutter can be driven in a state of a half shutter and a full shutter, a controller controls an execution of a sub-sampling preview mode if the digital camera function is driven, controls to fix white balance and exposure and automatically adjusts a focus upon detecting an input of the half shutter during the execution of the sub-sampling preview mode, switches to a full-pixel preview mode upon completion of the adjustment, and controls to perform image capturing upon detecting an input of the full shutter, and a memory stores the received image under the control of the controller. The controller may be adapted to drop the currently ongoing frame and capture a new frame, upon detecting the input of the full shutter.

In accordance with another aspect of the present invention, there is provided an apparatus for reducing a shutter lag of a digital camera, in which an electronic shutter can be driven in a state of a half shutter and a full shutter, an image sensor unit converts an image presently being input through a lens into an electrical signal, an image signal processor performs automatic focusing, automatic white balance automatic exposure, and other image processing on the image converted into the electrical signal, a controller controls execution of a sub-sampling preview mode if the digital camera function is driven, controls the image signal processor to fix white balance and exposure and automatically adjust a focus upon detecting an input of the half shutter during the execution of the sub-sampling preview mode, switches to a full-pixel preview mode and generates a complete signal to inform a user of a possibility of photographing upon completion of the adjustment, and controls to perform image capturing upon detecting an input of the full shutter, a memory temporarily stores the image processed in the image signal processor; and a display displays the image processed in the image signal processor.

In accordance with another aspect of the present invention, there is provided a method for reducing a shutter lag of a digital camera in a device with a digital camera function, in which a sub-sampling preview mode is executed if the digital camera function is driven, white balance and exposure are fixed and a focus is automatically adjusted upon detecting an input of a half shutter during the execution of the sub-sampling preview mode, the preview mode is switched from the sub-sampling preview mode to a full-pixel preview mode after the adjustment, and a complete signal is generated to inform a user of a possibility of photographing, after the mode switching.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF PRESENT INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
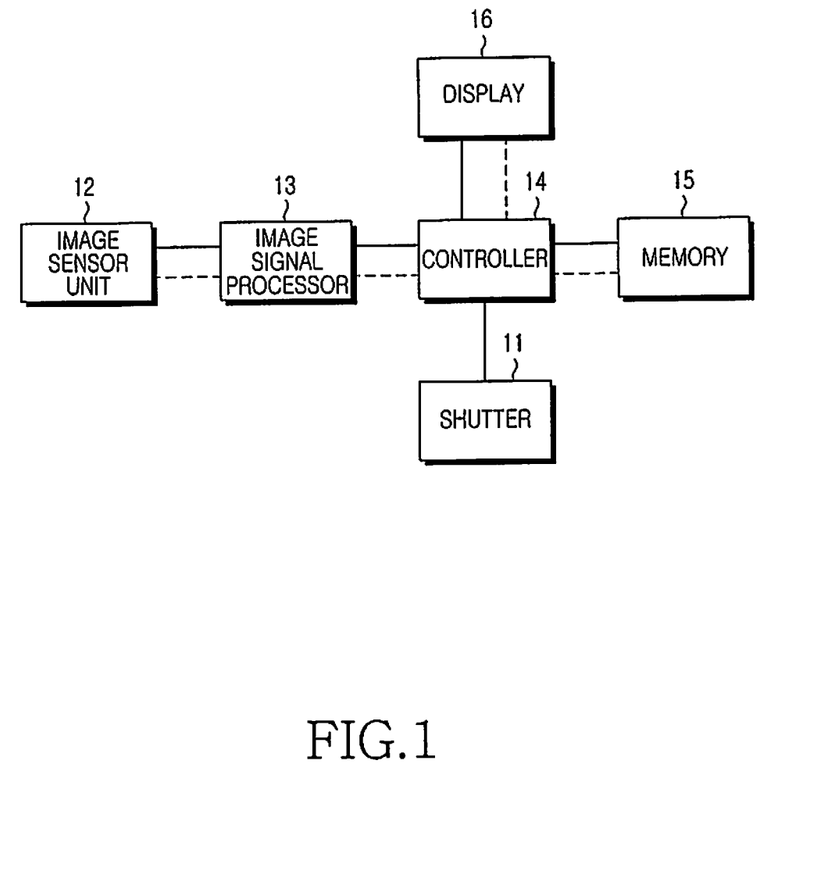
FIG. 1 is a diagram illustrating a structure of a camera apparatus according to an embodiment of the present invention.

FIG. 1 shows a structure of a camera apparatus according to an embodiment of the present invention, in which solid lines represent paths for control signals and dotted lines represent paths of image data. The camera apparatus described herein may be contained in a wireless terminal or other electronic devices.

Referring to FIG. 1, a shutter 11 may be input or pressed in a state of a half shutter or a full shutter. In the former case (half-shutter state), operations such as fixing Auto White Balance (AWB) and Auto Exposure (AE), and adjusting Auto Focus (AF) are performed, and in the latter case (full-shutter state), a capture operation is achieved.

An image sensor unit 12 converts one or more images input through a lens (not shown) into an electrical signal. Under normal circumstances, the image sensor unit 12 operates in a sub-sampling preview mode in which images are previewed at a low pixel capacity (or low resolution) regardless of the number of pixels (or resolution), which was preset by a user. Under the control of a controller 14, the image sensor unit 12 switches from the sub-sampling preview mode to a full-pixel preview mode in which images are previewed at a high pixel capacity (or high resolution) preset by the user. Although not shown in the drawing, the image sensor unit 12 may include a lens, a lens driving device for adjusting movement of the lens to perform a zoom function and the like, and an image sensor. The image sensor, which senses images and converts them into digital data, may include, for example, a CMOS Image Sensor (CIS) and a Charge Coupled Device (CCD). In the image sensor unit 12, factors such as an exposure time, a gain, and sub-sampling are subject to change.

An image signal processor 13 performs AE, AWB and AF on the one or more images converted into an electrical signal. To be specific, an output-related part such as a scaler and an output format, an image quality-related part such as Color Correction Matrix (CCM) and gamma, and an optical correction part such as shading compensation may undergo change. The image signal processor 13 may include a buffer (not shown) for temporarily storing one or more images converted into an electrical signal.

The controller 14 controls execution of the sub-sampling preview mode if a camera function is driven, controls the image signal processor 13 to fix AE and AWB and perform AF upon detecting an input of the half shutter in the sub-sampling preview mode, and upon completion of these operations, switches to a full-pixel preview mode and then generates a complete signal to inform the user that the preview mode is complete. The complete signal may be generated in many different ways, for example, the complete signal may include a visual signal, an acoustic signal, etc. The controller 14 may also include a buffer (not shown) for temporarily storing images received from the image signal processor 13.

A memory 15 stores one or more images processed in the image signal processor 13. The image sensor 12 and the image signal processor 13 may be integrated or the image signal processor 13 and the controller 14 may be integrated or the memory 15 and the controller 14 may be integrated in one integrated circuit. A display 16 displays one or more images processed in the image signal processor 13.

An external memory (not shown) may be installed in the above described-camera structure to store picture data. The 'picture data' as used herein refers to captured images the user decides to store, and the picture data may be stored in the memory 15 as well.

In the case where factors such as exposure time, gain and sub-sampling are changed in the image sensor unit 12, the time required in the image signal processor 13 to change the output part, the image quality part, and/or the optical correction part may serve as a factor of the shutter lag. Therefore, when the shutter 11 is input in the half-shutter state, the controller 14 may control to perform the AF operation upon detecting the half-shutter input and then switch the preview mode from the sub-sampling preview mode to the full-pixel preview mode upon completion of the AF operation. If the user soon presses the shutter 11 in the full-shutter state, the pertinent picture may be taken immediately without mode switching, significantly reducing the shutter lag. Since the short shutter lag may be implemented and the switching to the full-pixel preview mode occurs immediately after the completion of the AF operation, the novel AF operation can be quickly completed as in the general sub-sampling preview mode, and uses less power compared with when only the full-pixel preview mode is used. In addition, since the delay caused by the mode switching occurring immediately after the completion of the AF operation is included in the relatively long AF time, the user may experience almost no inconvenience.

Figure 2:
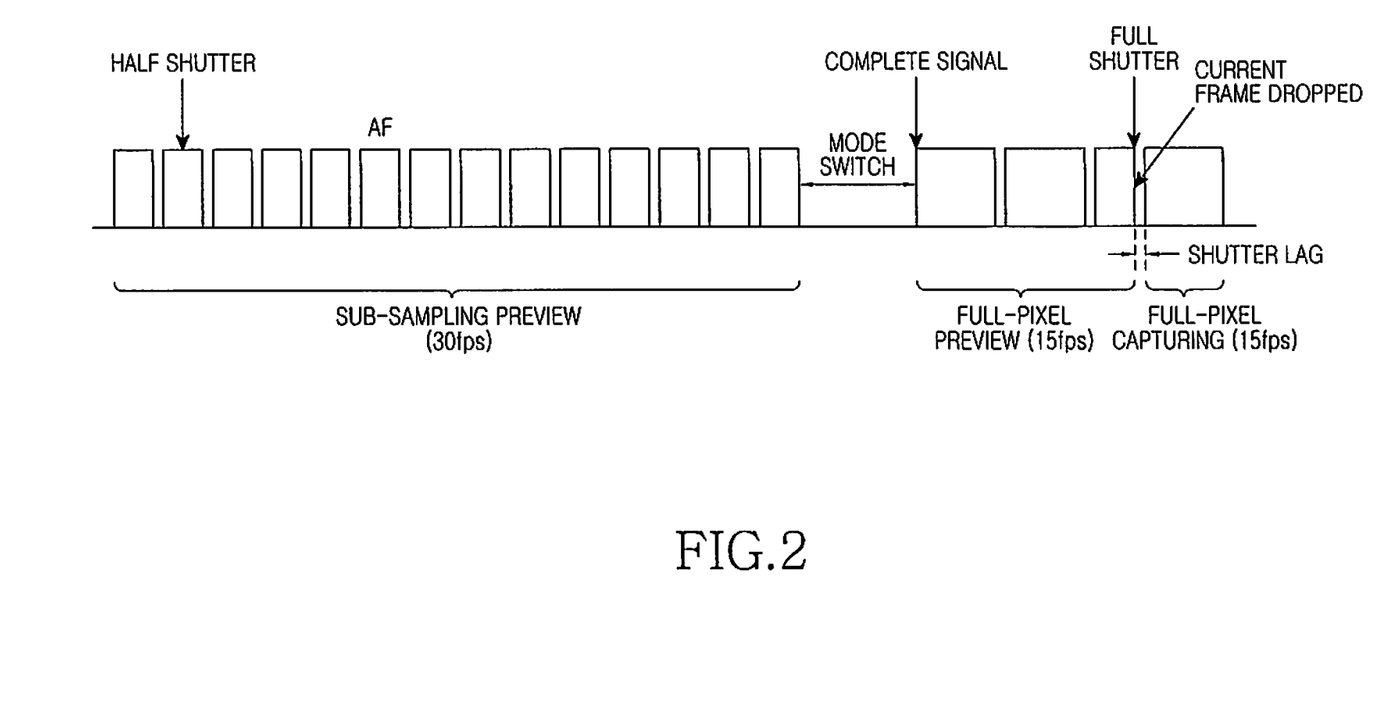
FIG. 2 is a diagram illustrating an operation from driving of a camera until capturing is performed, in a camera apparatus according to an embodiment of the present invention.

FIG. 2 shows an operation from driving of a camera until capturing is performed, in a camera apparatus according to an embodiment of the present invention.

Referring to FIG. 2, if a half shutter is input, the image signal processor 13 fixes AE and AWB and performs AF on one or more images converted into an electrical signal. All theses operations upon input of the half shutter are performed in the sub-sampling preview mode. After completion of the AF operation, the controller 14 switches from the sub-sampling preview mode to the full-pixel preview mode, and generates a complete signal to inform the user that the preview mode is complete. Thereafter, an image is captured upon detecting an input of the full shutter.

Figure 3:
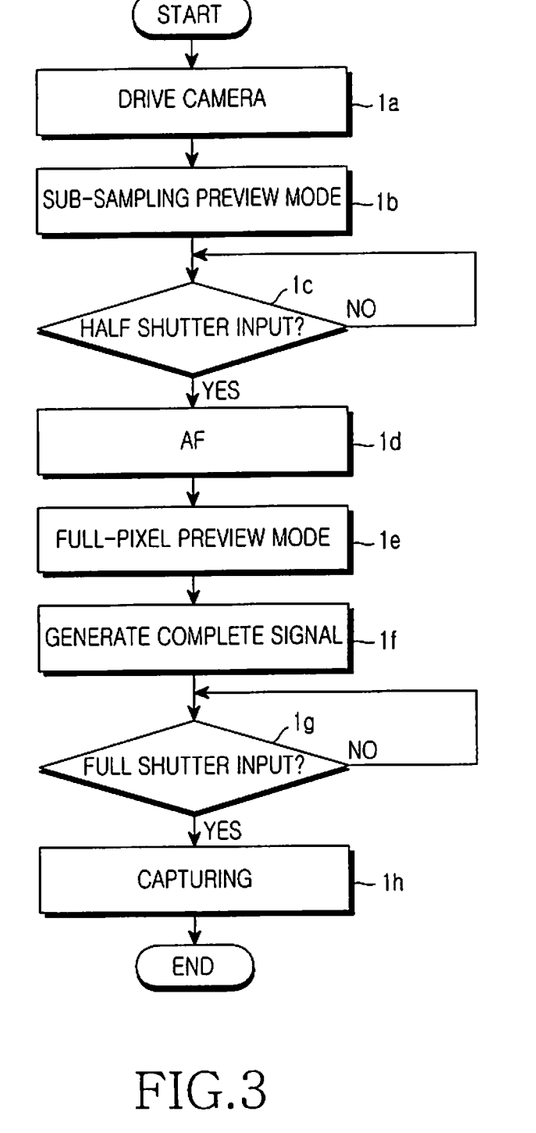
FIG. 3 is a flowchart illustrating a method for reducing a shutter lag in a camera apparatus according to an embodiment of the present invention.

FIG. 3 shows a method for reducing a shutter lag in a camera apparatus according to an embodiment of the present invention.

Referring to FIG. 3, if a camera module is driven (or powered on) by the user in step 1a, the camera module performs the sub-sampling preview mode in step 1b. The camera module waits until a half shutter is input. Upon detecting an input of the half shutter in step 1c, the camera module fixes AE and AWB and performs AF processing in step 1d, and switches to the full-pixel preview mode in step 1e. The camera module generates a complete signal to inform the user that the preview mode is complete in step 1f, and waits until a full shutter is input. Upon detecting an input of the full shutter in step 1g, the camera module performs capturing in step 1h.

The preview modes are a process in which the user monitors a moving image (or video) to take a desired picture. In preview mode, the camera module outputs only ¼ of all pixels using a sub-sampling function, and increases a frame rate to improve of visibility of moving images and reduce an AF time. The frame rate may be increased up to, for example, 30 frames per second (fps).

However, the general image sensor can support a frame rate of up to 15 fps in the case of all pixels. Hence, if the full-pixel preview is performed rater than the sub-sampling preview from the beginning to reduce the shutter lag, the AF time and power consumption may increase, hampering application of the invention to cell phones or other devices with limited power supplies. Accordingly, the present invention is embodied to initially perform sub-sampling preview and then implement full-pixel preview right after the completion of AF.

Figure 4:
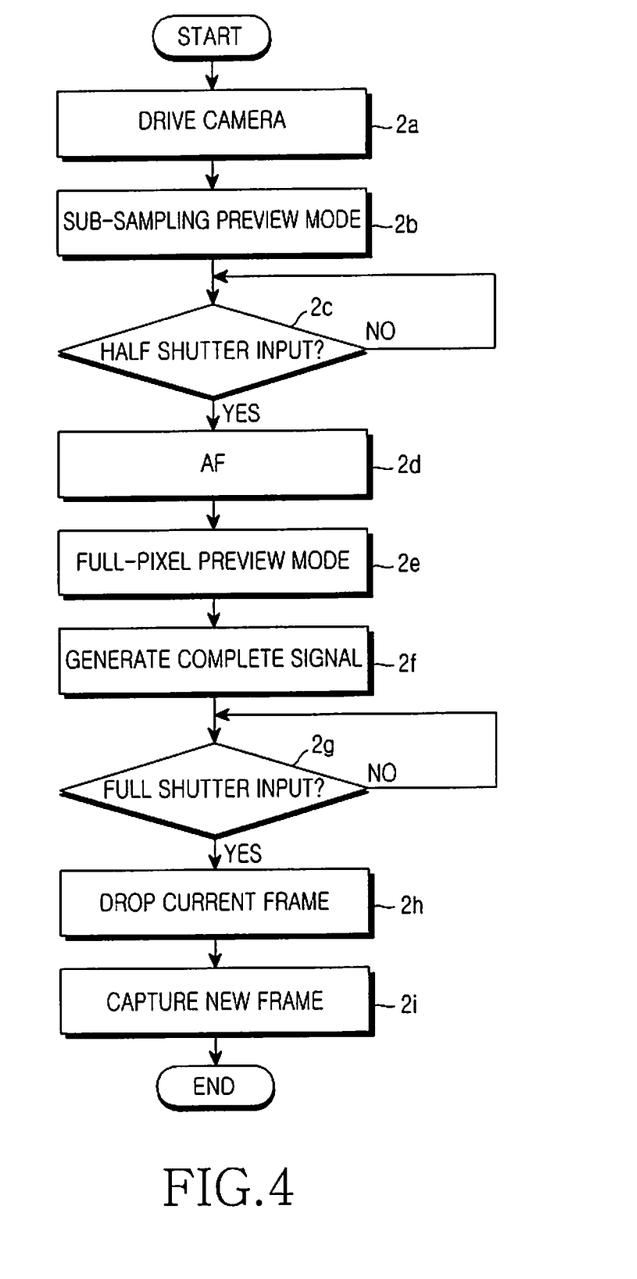
FIG. 4 is a flowchart illustrating a method for reducing a shutter lag in a camera apparatus according to another embodiment of the present invention.

FIG. 4 shows a method for reducing a shutter lag in a camera apparatus according to another embodiment of the present invention.

Referring to FIG. 4, if a camera module is driven (or powered on) by the user in step 2a, the camera module starts execution of the sub-sampling preview mode in step 2b, and waits until the half shutter is input. Upon detecting an input of the half shutter in step 2c, the camera module fixes AE and AWB and performs AF processing in step 2d, and switches to the full-pixel preview mode in step 2e. The camera module generates a complete signal to inform the user that the preview mode is complete in step 2f, and waits until the full shutter is input. Upon detecting an input of the full shutter in step 2g, the camera module drops an image corresponding to the current ongoing frame in step 2h, and captures an image corresponding to a new frame in step 2i.

As described above, the operation of steps 2a to 2g in FIG. 3 are identical to the operations of steps 1a to 1g in FIG. 3, but the embodiment of FIG. 4 is different from that of FIG. 3 in that upon detecting a full-shutter input in step 2g, the camera module drops the current ongoing frame in step 2h and captures a new frame in step 2i.

In summary, the camera module is adapted to drop the current ongoing frame of the full-pixel preview mode and immediately capture a new frame upon detecting the full-shutter input, the camera module does not need to wait until working on the current ongoing frame is completed, contributing to a reduction in the shutter lag.

Though the camera module may reduce the shutter lag by being adapted to perform mode switching right after AF processing upon detecting the half-shutter input, this camera module has the following drawbacks in acquiring the subject's image presently being displayed on the display 16, using the image sensor unit 12. In general, the image being displayed on the display 16 is not the currently input image, but an image that was input at least one frame prior. This is because in order to display a clean image, an image preceding a frame has been temporarily stored in a buffer in advance and the previous image stored in the buffer is presently displayed on the display 16. It is also possible to display clean images on the display 16 in real time without frame delay. In this case, however, components of the camera must be high speed and excellent in performance, which inevitably leads to increases in costs.

Reference will now be made to the following embodiments to solve the problem that upon detecting the full-shutter input, the camera module acquires an image of the next frame rather than the image presently displayed on the display 16.

Figure 5:
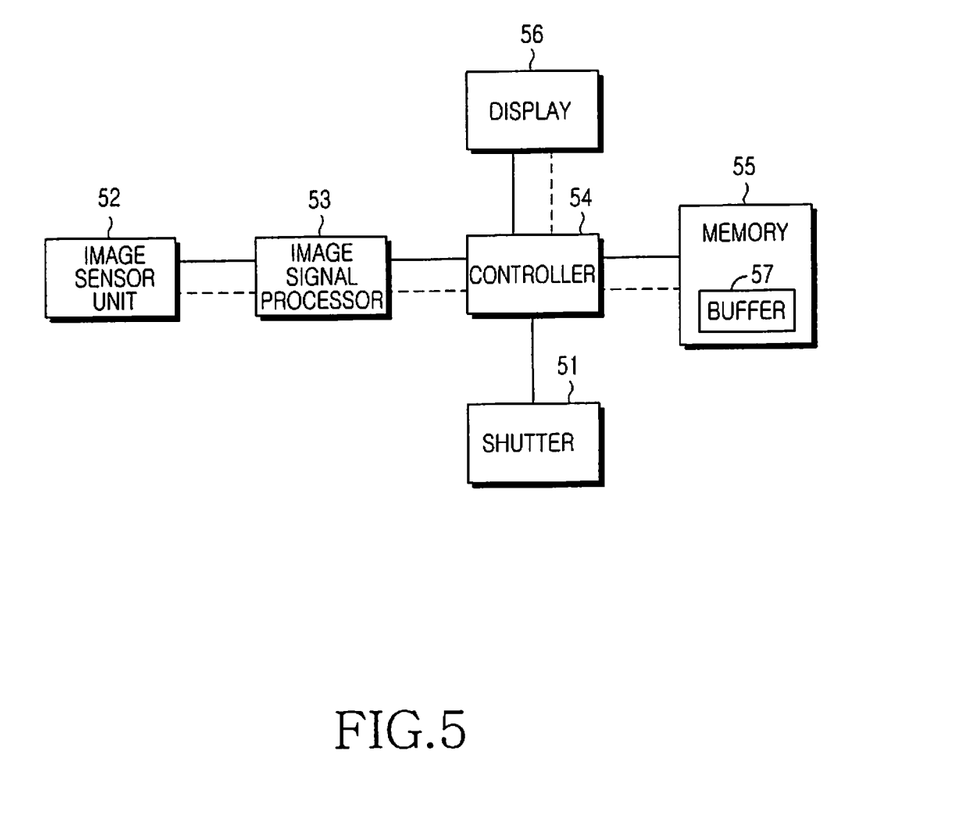
FIG. 5 is a diagram illustrating a structure of a camera apparatus with a buffer according to an embodiment of the present invention.

FIG. 5 shows a structure of a camera apparatus with a buffer according to an embodiment of the present invention, in which a buffer 57 is included in a memory 55. As defined in FIG. 1, solid lines represent paths for control signals and dotted lines represent paths of image data.

Referring to FIG. 5, a shutter 51 may be input in a state of a half shutter or a full shutter. In the former case, AE and AWB are fixed and an AF operation is performed, and in the latter case, a particular image temporarily stored in the buffer 57 in the memory 55 is selected and displayed on a display 56.

An image sensor unit 52 converts subject images input through a lens (not shown) into an electrical signals. Under normal circumstances, the image sensor unit 52 operates in a sub-sampling preview mode in which subject images are previewed at a low pixel capacity (or low resolution) regardless of the number of pixels (or resolution), which was preset by a user. Under the control of a controller 54, the image sensor unit 52 switches from the sub-sampling preview mode to a full-pixel preview mode in which subject images are previewed at a high pixel capacity (or high resolution) preset by the user. Although not shown in the drawing, the image sensor unit 52 may include a lens, a lens driving device for adjusting movement of the lens to perform a zoom function and the like, and an image sensor. The image sensor, which senses images and converts them into digital data, may include, for example, a CIS and a CCD. In the image sensor unit 52, factors such as an exposure time, a gain, and sub-sampling are subject to change.

An image signal processor 53 performs AE, AWB and AF on the image signal converted into an electrical signal. To be specific, an output-related part such as a scaler and an output format, an image quality-related part such as CCM and gamma, and an optical correction part such as shading compensation may undergo change.

The controller 54 controls execution of the sub-sampling preview mode if a camera function is driven, controls the image signal processor 53 to fix AE and AWB and perform AF upon detecting an input of the half shutter in the sub-sampling preview mode, and upon completion of these operations, switches to a full-pixel preview mode and then generates a complete signal to inform the user that the preview mode is complete. The complete signal may be generated in many different ways. For example, the complete signal may include a visual signal, an acoustic signal, etc.

The memory 55 includes the buffer 57 for temporarily storing one or more images received from the image signal processor 53. In the drawing, the buffer 57 may temporarily store the currently input image and its previous image that has been input at least one frame prior, and its image storage capacity is subject to change according to the manufacturing process or the user settings. Upon detecting a full-shutter input from the shutter 51, the controller 54 finally selects the image that is displayed on the display 56 at the moment the full shutter is input, or the image captured at the time closest to the full-shutter input time, among the images temporarily stored in the buffer 57, instead of capturing the image input from the image sensor unit 52 after the full-shutter time, displays the finally selected image on the display 56, and then stores the finally selected image either in the memory 55 or in an external memory (not shown).

The memory 55 and/or the buffer 57 may be integrated with the controller 54 in one integrated circuit.

The display 56 displays one or more images processed in the image signal processor 53. Because the image displayed on the display 56 is not the image presently input through the image sensor unit 52, but the image that has been input at least one frame prior, and upon detecting the full-shutter input, the controller 54 finally selects and outputs the image that is displayed on the display 56 at the moment the full shutter is input, or the image captured at the time closest to the full-shutter input time, among the images temporarily stored in the buffer 57, the user can store intact the image displayed on the display 56 or store the image captured at the time closest to that of the displayed image.

By storing the image corresponding to the current frame and the image corresponding to the previous frame in the buffer 57 included in the memory 55, it is possible to allow the user to acquire the image displayed on the display 56. In addition, since basically two or more images are temporarily stored in the buffer 57, the controller 54 may display all of the temporarily stored two or more images on the display 56 upon detecting the full-shutter input so that the user may choose and acquire one of them or both.

Figure 6:
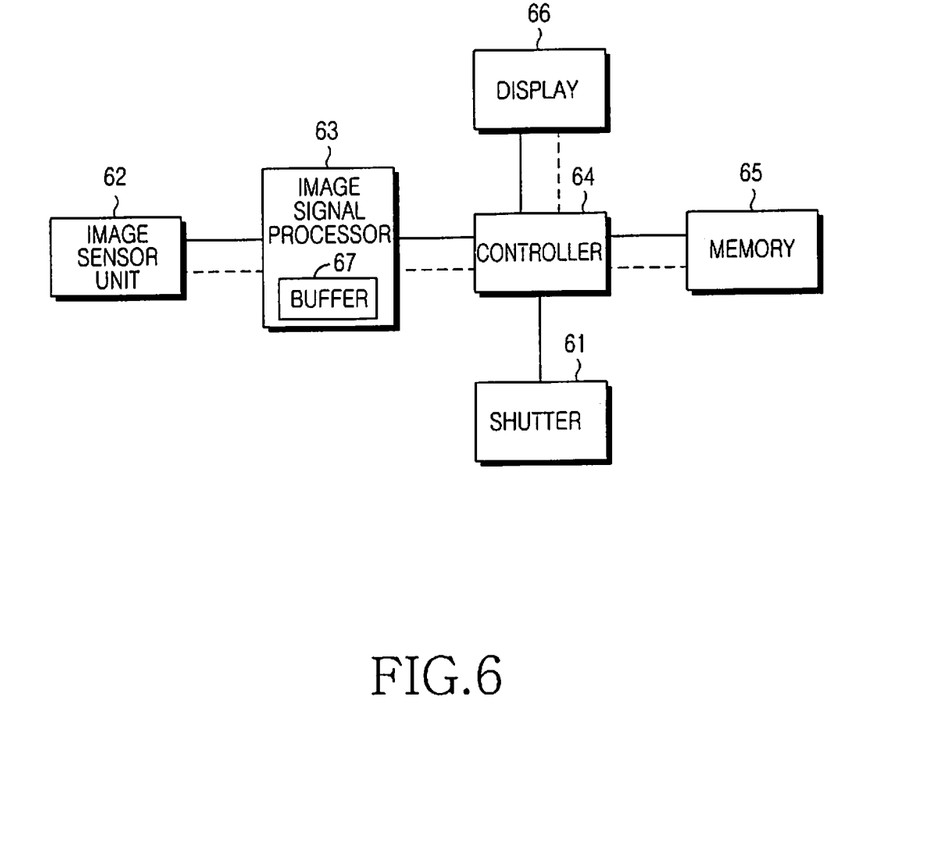
FIG. 6 is a diagram illustrating a structure of a camera apparatus with a buffer according to another embodiment of the present invention.

FIG. 6 shows a structure of a camera apparatus with a buffer according to another embodiment of the present invention, in which a buffer 67 is included in an image signal processor 63. As defined in FIG. 1, solid lines represent paths for control signals and dotted lines represent paths of image data.

Referring to FIG. 6, a shutter 61 may be input in a state of a half shutter or a full shutter. In the former case, AE and AWB are fixed and an AF operation is performed, and in the latter case, an image temporarily stored in the buffer 67 included in the image signal processor 63 is selected.

An image sensor unit 62 converts subject images input through a lens (not shown) into an electrical signal. Under normal circumstances, the image sensor unit 62 operates in a sub-sampling preview mode in which subject images are previewed at a low pixel capacity (or low resolution) regardless of the number of pixels (or resolution), which was preset by a user. Under the control of a controller 64, the image sensor unit 62 switches from the sub-sampling preview mode to a full-pixel preview mode in which subject images are previewed at a high pixel capacity (or high resolution) preset by the user. Although not shown in the drawing, the image sensor unit 62 may include a lens, a lens driving device for adjusting movement of the lens to perform a zoom function and the like, and an image sensor. The image sensor, which senses images and converts them into digital data, may include, for example, a CIS and a CCD. In the image sensor unit 62, factors such as an exposure time, a gain, and sub-sampling are subject to change.

The image signal processor 63 performs AE, AWB and AF on the image signal converted into an electrical signal. To be specific, an output-related part such as a scaler and an output format, an image quality-related part such as CCM and gamma, and an optical correction part such as shading compensation may undergo change.

The image signal processor 63 includes the buffer 67 that temporarily stores images received from the image sensor unit 62. In this drawing, the buffer 67 may temporarily store the currently input image and its previous image that has been input one frame prior, and its image storage capacity is subject to change according to the manufacturing process or the user settings. Upon detecting a full-shutter input from the shutter 61, the image signal processor 63 finally selects the previous image temporarily stored in the buffer 67 and provides it to the controller 64, instead of capturing the image input through the image sensor unit 62 after the full-shutter time and providing it to the controller 64. Thereafter, under the control of the controller 64, the finally selected image is displayed on a display 66, and stored either in a memory 65 or an external memory (not shown).

The controller 64 controls execution of the sub-sampling preview mode if a camera function is driven, controls the image signal processor 63 to fix AE and AWB and perform AF upon detecting an input of the half shutter in the sub-sampling preview mode, and upon completion of these operations, switches to a full-pixel preview mode and then generates a complete signal to inform the user that the preview mode is complete. The complete signal may be generated in many different ways. For example, the complete signal may include a visual signal, an acoustic signal, etc.

The memory 65 stores one or more images processed in the image signal processor 63.

The one or more images processed in the image signal processor 63 are temporarily stored in the buffer 67, and under the control of the controller 64, at least one of the one or more images temporarily stored in the buffer 67 are finally selected and provided to the controller 64. The image sensor 62 and the image signal processor 63 may be integrated or the image signal processor 63 and the controller 64 may be integrated or the memory 65 and the controller 64 may be integrated into one integrated circuit.

The display 66 displays the one or more images processed in the image signal processor 63. Because the one or more images displayed on the display 66 are not the image presently input through the image sensor unit 62, but the previous image that has been input at least one frame prior, the image finally output upon detecting the full-shutter input is also the previous image that has been input at least one frame prior, and the image finally output upon detecting the full-shutter input is also the image that is equal to, or closest in time to, the image that has been input at least one frame prior, the user can store intact the image displayed on the display 66 or store the image captured at the time closest to that of the displayed image or both.

By storing the image corresponding to the current frame and the image corresponding to the previous frame in the buffer 67 included in the image signal processor 63, it is possible to allow the user to acquire the image displayed on the display 66. In addition, since basically two or more images are temporarily stored in the buffer 67, the controller 64 may display all of the temporarily stored images on the display 66 upon detecting the full-shutter input so that the user may choose and acquire one of them, or both.

Although not shown in the drawing, the image signal processor 63 is controlled to fix AE and AWB and to perform AF upon detecting the half-shutter input. In the case where the controller 64 does not support high-speed communication like serial communication between the image signal processor 63 and the controller 64 when switching to the full-pixel preview mode upon completion of these operations and the image signal processor 63 does not support real-time high-speed JPEG compression, it is difficult for the image signal processor 63 to provide full-pixel images to the controller 64 with low-speed parallel communication. In this case, the image sensor unit 62 may provide full-pixel images to the image signal processor 63, and the image signal processor 63 may convert the received full-pixel images into low-capacity images of the level of the preview image and provide them to the controller 64 using low-speed parallel communication. Thereafter, if the full shutter is input, the image signal processor 63 may convert received full-pixel images into JPEG-coded images and provide them to the controller 64 with low-speed parallel communication.

In the case where two or more images are stored in the buffer 67 included in the image signal processor 63, if the full shutter is input, the image signal processor 63 JPEG-codes the previous-frame image that has been stored in the buffer 67 and is equal to or closest in time to the image presently being displayed on the display 66, and outputs the coded image to the controller 64, so the user may store intact the image displayed on the display 66 or store the image captured at the time closest to that of the displayed image, or both.

Figure 7:
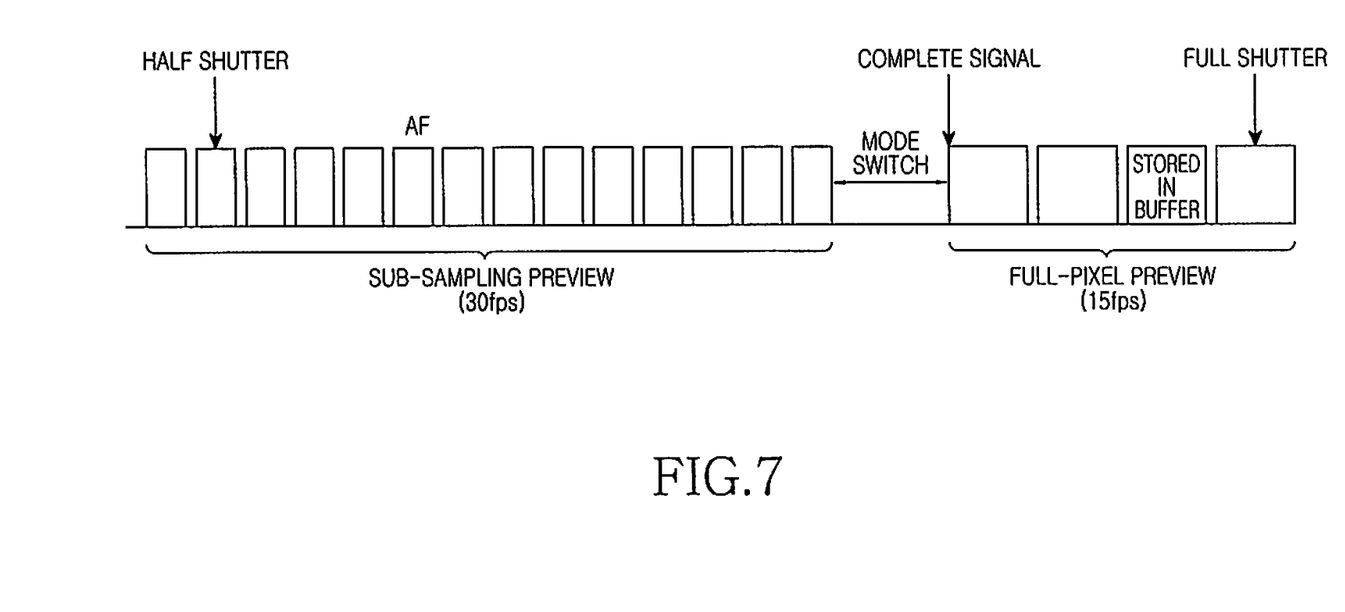
FIG. 7 is a diagram illustrating an operation from driving of a camera until an image is stored in a buffer and selected, in a camera apparatus according to an embodiment of the present invention.

FIG. 7 shows an operation from driving of a camera until an image is stored in a buffer and selected, in a camera apparatus according to an embodiment of the present invention.

Referring to FIG. 7, the process before mode switching is the same as shown in FIG. 2. One or more images received after the mode switching are temporarily stored in the buffer included in the image signal process or the memory, and one or more images temporarily stored in the buffer are selected if the full shutter is input.

Figure 8:
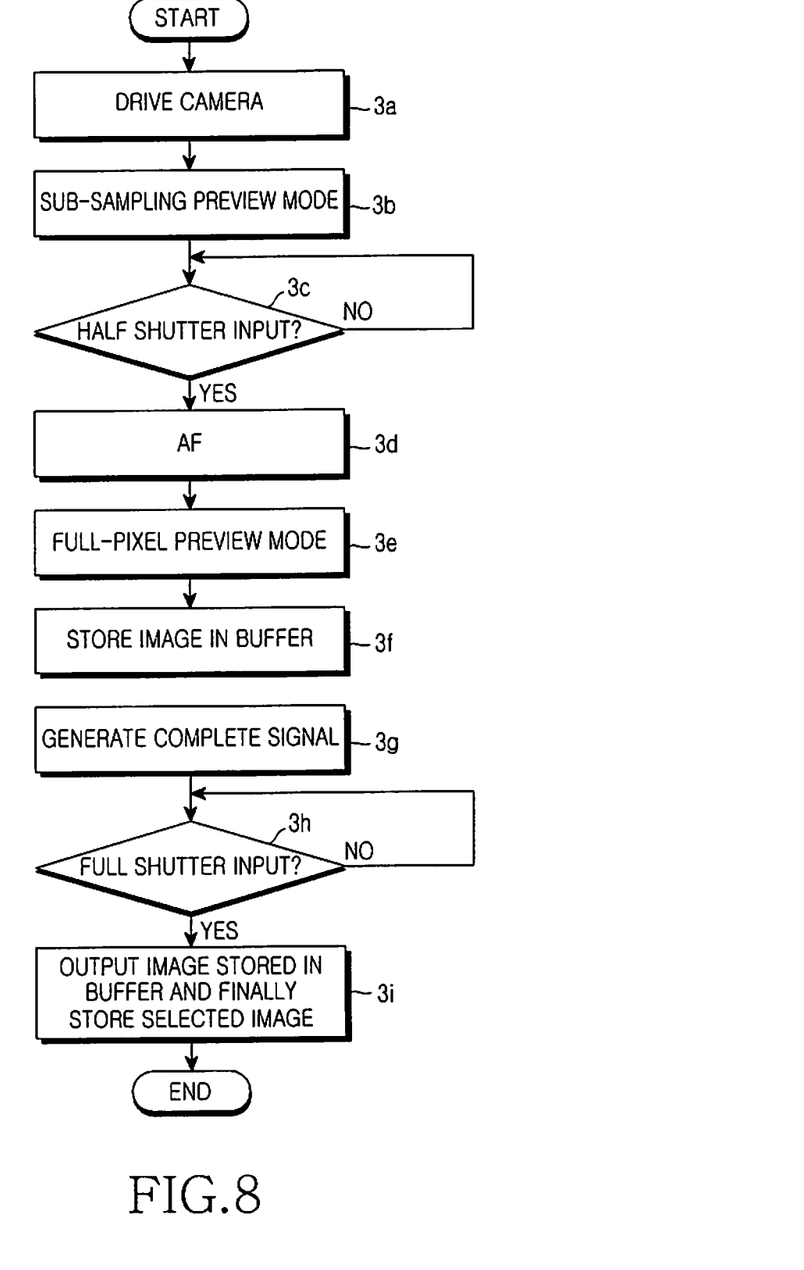
FIG. 8 is a flowchart illustrating a method for reducing a shutter lag in a camera apparatus with a buffer according to an embodiment of the present invention.

FIG. 8 shows a method for reducing a shutter lag in a camera apparatus with a buffer according to an embodiment of the present invention.

Referring to FIG. 8, if a camera module is driven (or powered on) by the user in step 3a, the camera module starts execution of the sub-sampling preview mode in step 3b, and waits until the half shutter is input. Upon detecting an input of the half shutter in step 3c, the camera module performs AE/AWB/AF processing in step 3d, and switches to the full-pixel preview mode in step 3e. One or more images received after the mode switching to the full-pixel preview mode are stored in the buffer included in the image signal processor or the memory in step 3f. Although only the currently input image and the previous-frame image are stored in the buffer in the present invention, other images may be stored depending on the user settings.

The camera module generates a complete signal to inform the user that the preview mode is complete in step 3g, and waits until the full shutter is input. Upon detecting an input of the full shutter in step 3h, the camera module selects one of the one or more images stored in the buffer, displays the selected image on the display, and finally stores an image selected by the user in step 3i. Because the image displayed on the display for the user is an image of the previous frame preceding the presently input image, the user selects the image of the previous image if he wants to store intact the image displayed on the display. Also, the user may check all of one or more images stored in the buffer, select one of them to display on the display, and finally store the selected image. The user may also store all of the buffered images.

As is apparent from the foregoing description, the camera apparatus according to the present invention is constructed to perform mode switching from the sub-sampling preview mode to the full-pixel preview mode right after the AF operation initiated by an input of the half shutter is completed, so a picture can be taken immediately without the mode switching when the full shutter is input, thus contributing to a reduction in shutter lag.

In addition, the camera apparatus is designed to drop the current ongoing frame and immediately capture a new frame upon detecting the full-shutter input, so the user does not need to wait until processing of the current frame is completed, preventing unnecessary waste of time.

Besides, by storing two or more images in the buffer, it is possible to acquire intact the image that is displayed on the display after the full shutter is input.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. An apparatus for reducing a shutter lag in a digital camera, the apparatus comprising:
   an electronic shutter capable of being driven in a half shutter state and a full shutter state;
   a controller for controlling an execution of a sub-sampling preview mode of a digital camera function, detecting an input of the half shutter state during the execution of the sub-sampling preview mode, upon detecting the input of the half shutter state, controlling to begin to fix white balance and exposure, and to automatically adjust a focus during the execution of the sub-sampling preview mode, controlling switching to a full-pixel preview mode upon completion of the adjustment and prior to detecting an input of the full shutter state, and controlling image capture upon detecting the input of the full shutter state;
   a memory for temporarily storing a first image being currently displayed on a display when detecting the input of the full shutter state and a second image to be displayed next to the first image; and
   the display for displaying, upon detecting input of the full shutter state, the first image and the second image to allow selection of one or both of the first image and the second image.

2. The apparatus of claim 1, wherein the controller selects at least one of the first image and the second image when performing the image capturing upon detecting the input of the full shutter state.

3. The apparatus of claim 2, wherein the controller finally selects the first image, when performing the image capturing upon detecting the input of the full shutter state.

4. The apparatus of claim 1, wherein if a new image is input, exceeding a capacity of a buffer of the memory, the buffer replaces an oldest image with the new image.

5. The apparatus of claim 1, wherein the controller generates a complete signal to inform a user that the sub-sampling preview mode is complete.

6. An apparatus for reducing a shutter lag of a digital camera, the apparatus comprising:
   an electronic shutter capable of being driven in a half shutter state and a full shutter state;
   an image sensor unit for converting an image presently being input through a lens into an electrical signal;
   an image signal processor for performing automatic focusing, automatic white balance, automatic exposure, and other image processing on the image converted into the electrical signal;
   a controller for controlling execution of a sub-sampling preview mode of a digital camera function, detecting an input of the half shutter state during the execution of the sub-sampling preview mode, upon detecting the input of the half shutter state, controlling the image signal processor to begin to fix white balance and exposure, and to automatically adjust a focus during the execution of the sub-sampling preview mode, controlling switching to a full-pixel preview mode prior to detecting an input of the full shutter state, and controlling image capture upon detecting the input of the full shutter state;

a memory for temporarily storing a first image being currently displayed on a display when detecting the input of the full shutter state and a second image to be displayed next to the first image; and the display for displaying, upon detecting input or the full shutter state, the first image and the second image to allow selection of one or both of the first image and the second image.

7. The apparatus of claim 6, wherein the controller is adapted to select at least one of the first image and the second image, upon detecting the input of the full shutter state, and to store the finally selected image in the memory or an external memory.

8. The apparatus of claim 6, wherein the controller is adapted to select the first image and store the selected image in the memory or an external memory, upon detecting the input of the full shutter state.

9. The apparatus of claim 6, wherein if a new image is input, exceeding a capacity of a buffer of the memory, the buffer replaces an oldest image with the new image.

10. The apparatus of claim 6, wherein at least two of the image sensor, the image signal processor, the controller, and the memory are integrated in one integrated circuit.

11. The apparatus of claim 6, wherein the image sensor unit outputs a full-pixel image to the image signal processor in the full-pixel preview mode, and the image signal processor outputs a processed full-pixel image to the controller upon detecting the input of the full shutter state.

12. The apparatus of claim 11, wherein the image signal processor selects one of the at least one full-pixel image stored in a buffer of the image signal processor and outputs the selected image to the controller, upon detecting the input of the full shutter state.

13. A method for reducing a shutter lag of a digital camera, the method comprising:

executing a sub-sampling preview mode of a digital camera function;

detecting an input of a half shutter state during the execution of the sub-sampling preview mode;

upon detecting the input of the half shutter state, beginning to fix white balance and exposure and to automatically adjust a focus during the execution of the sub-sampling preview mode;

switching from the sub-sampling preview mode to a full-pixel preview mode after the adjustment and prior to detecting an input of the full shutter state;

temporarily storing a first image being currently displayed on a display when detecting the input of the full shutter state and a second image to be displayed next to the first image; and selecting, upon detecting the input of a lull shutter state, one of the at least one of the first image and the second image.

14. The method of claim 13, further comprising generating a complete signal to inform a user that the sub-sampling preview mode is complete.

15. The method of claim 14, further comprising capturing an image upon detecting an input of a full shutter state, after generation of the complete signal.

\* \* \* \* \*